US009544727B1

(12) United States Patent
McMullen et al.

(10) Patent No.: US 9,544,727 B1
(45) Date of Patent: Jan. 10, 2017

(54) DETECTION AND USE OF ASYMMETRIC SIGNAL-STRENGTH TRANSITION AS INDICATION OF LOCATION UNCERTAINTY

(71) Applicant: Sprint Spectrum L.P., Overland Park Cumming, KS (US)

(72) Inventors: Michael P. McMullen, Leawood, KS (US); Mark Peden, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 123 days.

(21) Appl. No.: 14/613,082

(22) Filed: Feb. 3, 2015

(51) Int. Cl.
    *H04W 4/00*     (2009.01)
    *H04W 4/02*     (2009.01)
    *H04W 36/00*     (2009.01)
    *H04W 64/00*     (2009.01)

(52) U.S. Cl.
    CPC ........... *H04W 4/02* (2013.01); *H04W 36/0083* (2013.01); *H04W 64/003* (2013.01)

(58) Field of Classification Search
    CPC .................................................. H04W 64/003
    See application file for complete search history.

(56) References Cited

U.S. PATENT DOCUMENTS

| 2014/0018111 A1* | 1/2014 | Farley | ................... | G01S 5/0252 |
| | | | | 455/456.6 |
| 2016/0018507 A1* | 1/2016 | Chen | ..................... | G01S 5/0252 |
| | | | | 455/456.2 |

\* cited by examiner

*Primary Examiner* — John Blanton

(57) ABSTRACT

When a wireless communication device (WCD) is served by a first base station and not by a distant second base station, the WCD may initially be receiving strong pilot strength from the first base station and weak pilot strength from the second base station. Due to the WCD moving into a position where the first base station coverage is obstructed, however, the WCD may detect a quick drop in first base station pilot strength without a corresponding proportional increase in the second base station pilot strength, to the point that the second base station pilot signal is sufficiently stronger than first base station pilot signal that the WCD hands over to the second base station. In response to detecting that scenario, the WCD may report that the location of coverage of the second base station is an uncertain representation of the WCD's location, to help ensure reliable location-based service.

20 Claims, 4 Drawing Sheets

```
┌─────────────────────────────────────────┐
│ WHILE THE WCD IS BEING SERVED BY FIRST  │
│ STATION AND NOT BY SECOND BASE STATION, │
│ (I) THE WCD USES AT LEAST ONE RADIO     │
│ RECEIVER TO RECEIVE A FIRST PILOT       │
│ SIGNAL FROM THE FIRST BASE STATION AND  │
│ A SECOND PILOT SIGNAL FROM THE SECOND   │
│ BASE STATION, (II) THE WCD MONITORS A   │
│ FIRST PILOT STRENGTH OF THE RECEIVED    │
│ FIRST PILOT SIGNAL AND A SECOND PILOT   │
│ STRENGTH OF THE RECEIVED SECOND PILOT   │
│ SIGNAL, AND (III) BASED ON THE          │── 30
│ MONITORING, THE WCD DETERMINES THAT THE │
│ SECOND PILOT STRENGTH IS NOT            │
│ SUFFICIENTLY STRONGER THAN THE FIRST    │
│ PILOT STRENGTH TO TRIGGER HANDOVER OF   │
│ THE WCD FROM BEING SERVED BY FIRST BASE │
│ STATION TO BEING SERVED BY SECOND BASE  │
│ STATION                                 │
└─────────────────────────────────────────┘
                    │
                    ▼
┌─────────────────────────────────────────┐
│ THE WCD DETECTS AN ASYMMETRIC SIGNAL-   │
│ STRENGTH TRANSITION OF THE WCD,         │
│ INCLUDING (I) BASED ON THE WCD'S        │
│ MONITORING OF THE PILOT SIGNAL          │
│ STRENGTHS, THE WCD DETECTING A DECREASE │
│ IN THE FIRST PILOT STRENGTH AND AN      │
│ ABSENCE OF A CORRESPONDING PROPORTIONAL │
│ INCREASE IN THE SECOND PILOT STRENGTH,  │
│ TO A POINT THAT THE SECOND PILOT        │
│ STRENGTH BECOMES SUFFICIENTLY STRONGER  │
│ THAN THE FIRST PILOT STRENGTH TO        │── 32
│ TRIGGER HANDOVER OF THE WCD FROM BEING  │
│ SERVED BY THE FIRST BASE STATION TO     │
│ BEING SERVED BY THE SECOND BASE         │
│ STATION, AND (II) THE WCD DETECTING     │
│ THAT, DUE TO THE SECOND PILOT STRENGTH  │
│ THEREBY BECOMING SUFFICIENTLY STRONGER  │
│ THAN THE FIRST PILOT STRENGTH, THE WCD  │
│ HAS HANDED OFF FROM BEING SERVED BY THE │
│ FIRST BASE STATION TO BEING SERVED BY   │
│ THE SECOND BASE STATION                 │
└─────────────────────────────────────────┘
                    │
                    ▼
┌─────────────────────────────────────────┐
│ IN RESPONSE TO AT LEAST DETECTING THE   │
│ ASYMMETRIC SIGNAL-STRENGTH TRANSITION,  │
│ THE WCD TRANSMITS TO A NETWORK ENTITY   │
│ AN INDICATION THAT THE LOCATION OF      │── 34
│ COVERAGE OF THE SECOND BASE STATION IS  │
│ AN UNCERTAIN REPRESENTATION OF LOCATION │
│ OF THE WCD                              │
└─────────────────────────────────────────┘
```

Fig. 3

DETECTION AND USE OF ASYMMETRIC SIGNAL-STRENGTH TRANSITION AS INDICATION OF LOCATION UNCERTAINTY

BACKGROUND

A typical wireless communication system includes a number of base stations each configured to provide one or more respective wireless coverage areas in which to serve wireless communication devices (WCDs) such as cell phones, wirelessly-equipped personal computers or tablets, tracking devices, embedded wireless communication modules, or other devices equipped with wireless communication functionality (whether or not operated by a human user). Each base station is then typically coupled with supporting network infrastructure that provides connectivity with transport networks such as the public switched telephone network (PSTN) and/or the Internet. That way, when a WCD is positioned within a coverage area of any base station, the WCD may be served by the base station and may thereby engage in communications via the base station with other entities on the transport networks and/or with other WCDs served by the base station.

As many WCDs are mobile, it has become standard practice to provide location-based services keyed to WCD location. Examples of such services take various forms, including, without limitation, providing navigation guidance and information about points of interest, tracking packages or other objects, locating lost or stolen WCDs, and providing emergency response service (e.g., 911 call routing and dispatching of emergency personnel). To facilitate providing location-based services keyed to the location of a WCD, a location-based service provider (LBSP) learns the location of the WCD and then takes action (e.g., providing information, dispatching assistance, etc.) based on that location.

In practice, an LBSP could learn the location of a WCD in various ways. For example, the LBSP could receive from the WCD itself a report of the WCD's location. As another example, when the WCD is being served by a wireless communication system, the LBSP could receive from a location-determination platform associated with that system a report of the WCD's location as determined by the platform.

Further, in these or other examples, the WCD's location could be determined and reported with varying levels of granularity. For instance, the WCD's location could be determined and reported with very high granularity based on Global Positioning System (GPS) satellite signals. As another example, the WCD's location could be determined and reported with somewhat less granularity through triangulation (e.g., advanced forward link trilateration) established based on signal-delay or signal-strength between WCD from three or more base stations at known locations. And as still another example, the WCD's location could be determined and reported simply as a location of coverage of a base station serving the WCD, such as a centroid of the base station's coverage area in which the WCD is operating. Which of these representations of the WCD's location is used in a given situation may depend on the type of location-based service to be provided and on various other factors (such as whether GPS signals are available, whether base station signals are available, and so forth).

OVERVIEW

The present disclosure addresses a problem that may arise when a WCD is served by a base station from which the WCD is receiving strong coverage but the WCD is also within weak coverage of another, distant base station, and the WCD then moves into a position with obstructed coverage of the serving base station, thus causing the WCD to hand over to be served instead by the distant base station.

FIG. 1 depicts this scenario by way of example. As shown in FIG. 1, a WCD 10 is initially served by base station 12 and is in good coverage of base station 12, but the WCD is also within weak coverage of distant base station 14. In that situation, the signal strength that the WCD detects from base station 14 may not be sufficiently higher than the signal strength that that the WCD detects from base station 12 to trigger handover of the WCD from being served by base station 12 to being served by base station 14. However, as further shown, the WCD then moves from that position into a place where coverage of base station 12 is obstructed, while still remaining in roughly the same (similar) weak coverage of distant base station 14. As a result of this movement, the WCD may experience a quick decrease of signal strength from base station 12 without an associated increase in signal strength from base station 14, which may result in the signal strength that the WCD detects from base station 14 being sufficiently higher than the signal strength that the WCD detects from base station 12 to trigger handover of the WCD from being served by base station 12 to being served by base station 14. Consequently, even though the WCD is still receiving a weak signal from base station 14, the WCD may hand over from being served by base station 12 to being served by base station 14, because the signal from base station 14 is now threshold stronger than the obstructed signal from base station 12.

This transition of the WCD can be considered an asymmetric signal-strength transition, as the WCD handover from base station 12 to base station 14 occurs as a result of the WCD experiencing a decrease of signal strength from base station 12 without a corresponding proportional increase of signal strength from base station 14. Such a transition can be distinguished from a scenario where the WCD simply moves progressively farther away from base station 12 and closer to base station 14—in which case the signal strength from base station 14 would increase proportional to the decrease in signal strength from base station 12.

The asymmetric signal-strength transition can pose an issue if location of coverage of base station 14 is then used as a representation of location of the WCD, to facilitate a location-based service. The problem in that scenario is that the WCD is actually closer to base station 12 than to base station 14, so it may be better to represent the WCD's location as the location of coverage of base station 12 than as the location of coverage of base station 14. But as the WCD is now served by base station 14 (as a result of the handover), the location of coverage of base station 14 may be used as a representation of the location of the WCD. Thus, the representation of location of the WCD may be questionable.

In accordance with the present disclosure, a WCD will detect when it engages in such an asymmetric signal-strength transition (resulting in handover of the WCD to base station 14), and the WCD will responsively transmit to a network entity an indication that location of coverage of base station 14 is an uncertain representation of location of the WCD. In one example implementation, the network entity may be the LBSP that will provide a location-based service keyed to the WCD's location and, if the WCD's location is represented as a location of coverage of the WCD's current serving base station (base station 14), the LBSP may thus benefit from the indication of uncertainty, such as by then engaging in further signaling with the WCD to get a better read on the WCD's actual location. In another example implementation, the network entity may be a location-determination platform associated with a wireless communication system serving the WCD. Such a platform may then similarly engage in further signaling with the WCD to get a better read on the WCD's actual location and/or may convey the indication of uncertainty to a LBSP along with a representation of the WCD's location as a location of coverage of base station 14, and the LBSP may then respond as noted above as well. Other examples are possible as well.

Accordingly, in one respect, disclosed herein is a method for establishing location uncertainty due to asymmetric signal-strength transition of WCD. In accordance with the method, while the WCD is being served by a first base station and not by a second base station, (i) the WCD uses at least one radio receiver to receive a first pilot signal from the first base station and a second pilot signal from the second base station, (ii) the WCD monitors a first pilot strength of the received first pilot signal and a second pilot strength of the received second pilot signal, and (iii) based on the monitoring, the WCD determines that the second pilot strength is not sufficiently stronger than the first pilot strength to trigger handover of the WCD from being served by the first base station to being served by the second base station. In turn, the WCD then detects an asymmetric signal-strength transition of the WCD, including (i) based on the monitoring, detecting a decrease in the first pilot strength and an absence of a corresponding proportional increase in the second pilot strength, to a point that the second pilot strength becomes sufficiently stronger than the first pilot strength to trigger handover of the WCD from being served by the first base station to being served by the second base station, and (ii) detecting that, due to the second pilot strength thereby becoming sufficiently stronger than the first pilot strength, the WCD has handed off from being served by the first base station to being served by the second base station. In response to at least that asymmetric signal-strength transition, the WCD then transmits to a network entity an indication that location of coverage of the second base station is an uncertain representation of location of the WCD.

In addition, in another respect, disclosed is a WCD configured to detect and report location uncertainty due to asymmetric signal-strength transition. In accordance with the disclosure, the WCD includes a wireless communication interface configured to receive pilot signals from base stations, and the WCD includes a controller configured to monitor signal strength of the received pilot signals, to detect an asymmetric signal-strength transition of the WCD, and, responsive to at least detecting the asymmetric signal-strength transition of the WCD, to report location-uncertainty to a network entity.

With this WCD configuration, while the WCD is being served by a first base station and not by a second base station, the wireless communication interface receives a first pilot signal from the first base station and a second pilot signal from the second base station, and the controller determines, based on the monitoring, that first pilot signal has a first pilot strength, that the second pilot signal has a second pilot strength, and that the second pilot strength is not sufficiently stronger than the first pilot strength to trigger handover of the WCD from being served by the first base station to being served by the second base station.

Further, in line with the discussion above, the act of the WCD detecting the asymmetric signal-strength transition may involve (i) detecting, based on the monitoring, a decrease in the first pilot signal strength and an absence of a corresponding proportional increase in the second pilot strength, to a point that the second pilot strength becomes sufficiently stronger than the first pilot strength to trigger handover of the WCD from being served by the first base station to being served by the second base station, and (ii) detecting that, due to the second pilot strength thereby becoming sufficiently stronger than the first pilot strength, the WCD has handed over from being served by the first base station to being served by the second base station. In turn, the act of reporting the location-uncertainty to the network entity may involve transmitting to the network entity an indication that location of coverage of the second base station is an uncertain representation of location of the WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is a flow chart depicting operations that can be carried out in accordance with the disclosure.

DETAILED DESCRIPTION

Figure 1:
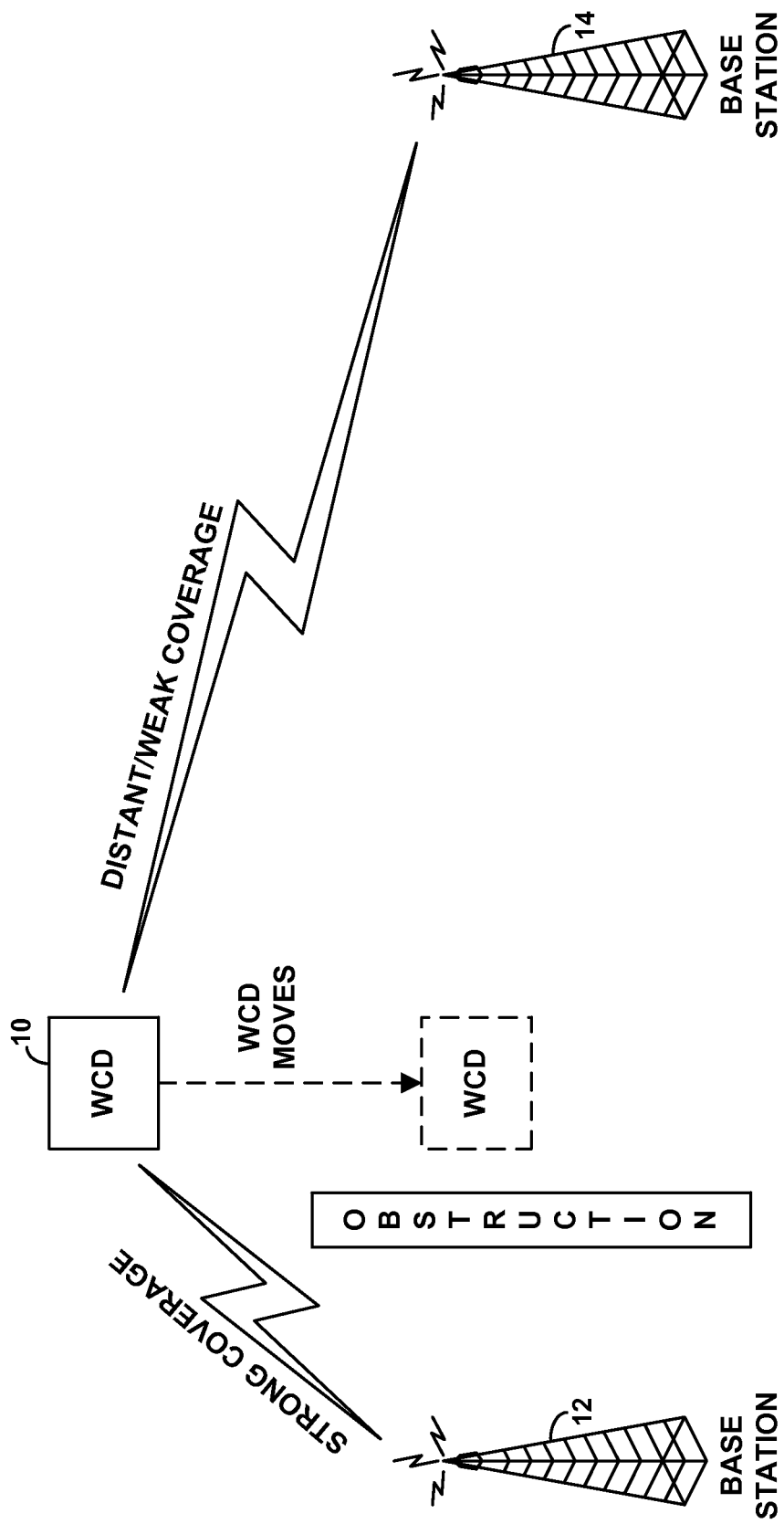
FIG. 1 is a simplified block diagram depicting an asymmetric change in signal-strength due to movement of a WCD to a position where its serving base station coverage is obstructed.

Referring to the drawings, as noted above, FIG. 2 is a simplified block diagram of an example network in which embodiments of the present method and apparatus can be implemented. It should be understood, however, that these and other arrangements described herein are set forth for purposes of example only and that numerous variations are possible. For instance, elements, arrangements, and functions may be added, removed, combined, distributed, or otherwise modified. In addition, it will be understood that features described here as being performed or provided by one or more entities may be implemented in various ways, such as by a processor executing programmed instructions for instance.

Figure 2:
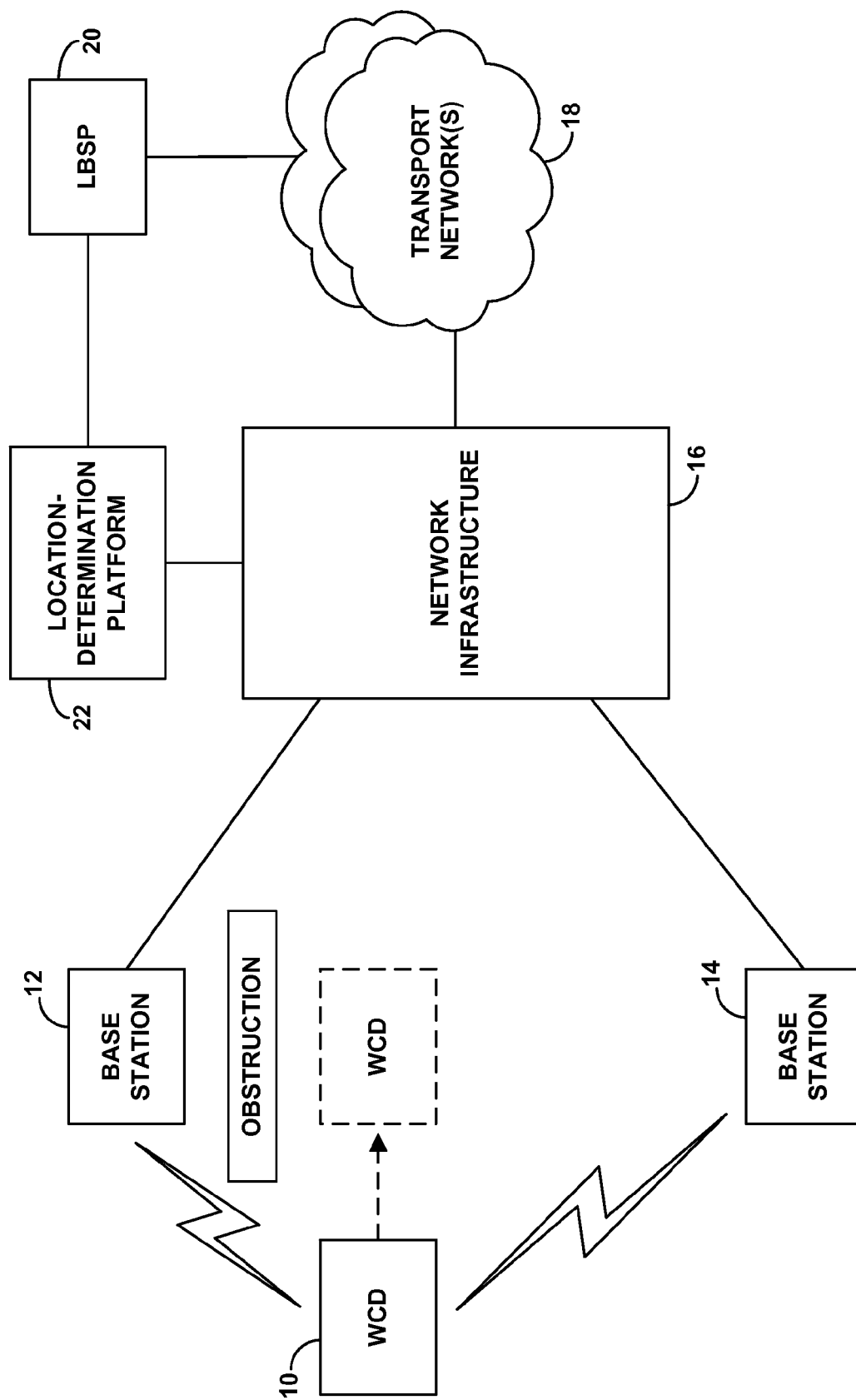
FIG. 2 is a simplified block diagram in which features of the present disclosure can be implemented.

As shown in FIG. 2, the example network includes base stations 12 and 14 as described above, and the figure illustrates WCD 10 initially in good coverage of base station 12 and distant, poor coverage of base station 14, and the WCD moving into a position where its coverage of base station 12 is obstructed but where it is still in distant, poor coverage of base station 14. In this figure, the distances are not shown as extreme as in FIG. 1, but the reader will appreciate that the issue described above may arise in the context of FIG. 2 in practice.

Base stations 12 and 14 are shown interconnected with a common set of network infrastructure 16, which could include one or more base station controllers, radio network controllers, switches, gateways, mobility management entities, or the like, at least a portion of which may then provide connectivity with one or more transport networks 18 such as those noted above for instance. In this arrangement, the base stations may thus be owned and/or operated by the same wireless service provider as each other, which may similarly own and operate the network infrastructure providing connectivity with the transport network(s). Alternatively, the base stations could be owned and/or operated by different wireless service providers, in which case the base stations may be coupled with different network infrastructure than each other. In either case, it may be possible for the WCD to hand over from being served by one of the base stations to being served by the other base station.

Shown accessible via at least one such transport network 18 is then an example LBSP 20, which could be an emergency services network (e.g., including a public safety answering point (PSAP)), a navigation server, or any other type of LBSP configured to provide at least one location-based service keyed to WCD location. Further, shown interconnected with the network infrastructure 16 and having a path for communication with the LBSP 20 is a location-determination platform 22, which could be owned and/or operated by the wireless service provider that owns and/or operates one or more of the base stations and the associated network infrastructure, and could be configured to determine and report WCD locations to support location-based services.

Base stations 12 and 14 may be configured to provide wireless service in accordance with one or more air interface protocols, examples of which include Orthogonal Frequency Division Multiple Access (OFDMA) (e.g., Long Term Evolution (LTE)), Code Division Multiple Access (CDMA), Global System for Mobile Communication (GSM), and/or others now known or later developed. And WCD 10 may be configured to be served in accordance with such protocol(s).

In practice, in each coverage area provided by a base station, the base station may broadcast a pilot signal (e.g., reference signal) that WCDs such as WCD 10 can monitor as basis to detect coverage and evaluate coverage strength. Further, each coverage area may have a respective coverage area identifier, which could be encoded in or otherwise represented by the pilot signal broadcast in the coverage area and/or by associated signaling, possibly in combination with an identifier of the base station that provides the coverage area. Thus, a WCD may monitor pilot signals to detect and evaluate coverage strength and may further determine the identity of the coverage area at issue.

When a WCD first powers on or enters into the wireless communication system, the WCD may scan for a strongest such pilot signal and, upon detecting the strongest pilot signal, may register to be served by the base station that provides that coverage area. The WCD may then operate in either an idle mode or an active/connected mode. In the idle mode, the WCD may not have an assigned radio-link layer connection with the serving base station but may monitor control transmissions from the base station to obtain system information and to receive any page messages or control signals. In the active/connected mode, on the other hand, the WCD has an assigned radio-link layer connection with the serving base station, though which the WCD can engage in bearer communication with remote entities for instance.

Further, as a WCD is being served in a base station's coverage area in the idle mode or in the active mode, the WCD may regularly monitor pilot signals strength of that coverage area (from that base station) and pilot signal strength of any other coverage areas extending to the WCD's position (including perhaps one or more other coverage areas provided by the same base station and one or more coverage areas provided by one or more other base stations). If the WCD thereby detects that the pilot signal strength of another coverage area is sufficiently stronger than the pilot signal strength of the WCD's current serving coverage area, then the WCD may engage in a handover process. In the idle mode, this handover process may involve the WCD simply transitioning from operating in the idle mode in one coverage area to operating in the idle mode in the other coverage area, and possibly signaling to notify the network of the WCD's new coverage area. In the active/connected mode, this handover process may also involve signaling between the WCD and the network to facilitate transferring the WCD's connection from one coverage area to another. In practice, these handoffs may thus occur between coverage areas of a given base station or between coverage areas of different base stations (and thus between base stations).

With the arrangement of FIG. 2, LBSP 20 may seek to provide a location-based service keyed to the location of WCD 10 and may thus need to determine the location of the WCD to facilitate providing that service. For simplicity, the remainder of this description will address the scenario where the LBSP 20 is PSAP (or more generally an emergency services system) that the WCD calls or otherwise contacts to request emergency assistance, in which case the LBSP would need to determine the WCD's location in order to facilitate dispatching emergency assistance to that location. It should be understood, however, that the principles discussed in this document can apply as well in numerous other situations where location of a WCD may be used to facilitate providing a location-based service.

In line with the discussion above, the LBSP (PSAP) may learn the location of the WCD in various ways. By way of example, the LBSP could receive an indication of the WCD's location from the WCD itself. For instance, if the WCD engages in Session Initiation Protocol (SIP) or other such signaling to set up its call to the LBSP, the WCD could include an indication of its location in that signaling so that the LBSP receives the indication at the time of the call setup. And as another example, the LBSP could receive an indication of the WCD's location from the location-determination platform 22, which could receive an indication of the WCD's location from the WCD or could determine the WCD's location in various other ways, such as those noted above for instance. In the scenario where the LBSP obtains the WCD's location from the location-determination platform, the LBSP could request and receive the location, or the location-determination platform could push the information to the LBSP.

As further noted above, the granularity of the WCD's location could range from highly granular (e.g., GPS-based location) to very coarse (e.g., the location of coverage of the base station serving the WCD, such as the centroid or shape of the coverage area in which the WCD is operating or the location of the base station itself), and the WCD or other provider of the location could specify the level of granularity along with the location.

Clearly, for certain purposes, such as emergency services, it would be best to use highly granular location. However, in some situations, it may not be feasible to determine the WCD's location with any greater granularity than merely the location of coverage of the WCD's serving base station. This may be the case if the WCD is not in good GPS coverage and perhaps if there is sufficient air interface noise or other issues that would preclude even triangulation or the like based on base-station signals. In that case, the best available representation of the WCD's location may be the location of coverage of the serving base station.

When the WCD's location is represented as a location of coverage of the WCD's serving base station, that representation of the WCD's location could be provided to the LBSP as an identity of the coverage area and/or as geographic coordinates or other such data denoting the location of coverage of the base station. For instance, the WCD or location-determination platform could transmit to the LBSP the identity of the coverage area in which the WCD is operating, and the LBSP could then refer to suitable mapping data to determine a representative geographic location of the indicated coverage area. Alternatively, given the identity of the coverage area, the WCD or location-determination platform could refer to suitable mapping data to determine a representative geographic location of the coverage area and could then transmit to the LBSP the representative geographic location of coverage. In line with the discussion above, the location of coverage of the WCD's serving base station may be set forth as geographic coordinates of the centroid of the base station's coverage area, geographic coordinates of vertices, points, and/or distances, defining a shape of the coverage area, and/or geographic coordinates of the location of the base station itself. Other examples are possible as well.

As discussed above, the issue addressed by this disclosure arises when the WCD experiences an asymmetric signal-strength transition including handover from base station 12 to base station 14, and when the location of the WCD may then be represented as the location of coverage of base station 14. In that scenario, as noted above, use of the location of coverage of base station 14 as a representation of the location of the WCD is questionable, as the WCD is really closer to base station 12, having handed over to be served by base station 14 because the WCD moved into a position where coverage of base station 12 is obstructed.

As noted above, the disclosure helps address that situation by having the WCD detect the asymmetric signal-strength transition and responsively transmit to a network entity an indication that the location of coverage of the WCD's serving base station is an uncertain (i.e., suspect or questionable) representation of location of the WCD. Provided with such an indication, the network entity, or another entity that receives the provided indication, can then take action, such as requesting further details about the WCD's location or the like.

FIG. 3 is a flow chart depicting operations that could be carried out by the WCD in an example implementation, to establish (e.g., determine and provide notification of) location uncertainty due to asymmetric signal-strength transition of the WCD. As shown in FIG. 3, at block 30, while the WCD is being served by base station 12 and not by base station 14, (i) the WCD uses at least one radio receiver to receive a first pilot signal from base station 12 and a second pilot signal from base station 14, (ii) the WCD monitors a first pilot strength of the received first pilot signal and a second pilot strength of the received second pilot signal, and (iii) based on the monitoring, the WCD determines that the second pilot strength is not sufficiently stronger than the first pilot strength to trigger handover of the WCD from being served by base station 12 to being served by base station 14.

In practice, these functions may occur as part of the WCD's regular monitoring of pilot signals to determine whether handover would be appropriate. As the WCD detects pilot signals from its serving base station 12 and from base station 14, the WCD may measure received signal strength respectively of each pilot signal and may determine whether the signal strength from base station 14 is more than a predefined non-zero delta or percentage higher than the signal strength from base station 12 and, if so, may trigger a handover. According to block 30, however, the WCD's initial state of operation would be such that signal strength from base station 12 is fairly high and signal strength from base station 14 is fairly low.

At block 32, the WCD detects an asymmetric signal-strength transition of the WCD, which includes (i) based on the WCD's monitoring of the pilot signal strengths, the WCD detecting a decrease in the first pilot strength and an absence of a corresponding proportional increase in the second pilot strength, to a point that the second pilot strength becomes sufficiently stronger than the first pilot strength to trigger handover of the WCD from being served by base station 12 to being served by base station 14, and (ii) the WCD detecting that, due to the second pilot strength thereby becoming sufficiently stronger than the first pilot strength, the WCD has handed off from being served by base station 12 to being served by base station 14.

In line with the discussion above, this may occur, for instance, as the WCD moves into a position in which its coverage of base station 12 is obstructed and thus its signal strength from base station 12 decreases, but without the WCD perceiving a corresponding proportional increase in signal strength from base station 14—but yet where the end result is that the signal strength from base station 14 becomes more than the threshold delta or percentage higher than the signal strength from base station 12, thus justifying a handover of the WCD from being served by base station 12 to being served by base station 14.

As a more specific example of this, the WCD may detect that the first pilot strength decreases threshold faster than any increase in the second pilot signal strength (if there is any increase in the second pilot signal strength), to the point that the second pilot strength becomes sufficiently stronger than the first pilot strength to trigger handover of the WCD from being served by base station 12 to being served by base station 14. In this regard, the WCD may consider the slope of change of each pilot signal strength per time, determining that the downward slope of the first pilot signal strength is greater by a threshold delta or percentage than any (if any) upward slope of the second pilot signal strength. In one implementation of this example, the WCD may detect that there has been no increase at all in the second pilot strength but that the first pilot strength has quickly decreased (e.g., decreased to half or so within a minute or so), to a point that the second pilot strength has become sufficiently stronger than the first pilot strength to trigger handover of the WCD from being served by base station 12 to being served by base station 14.

Further, as another example, the WCD could detect that the first pilot strength decreases to a new first pilot strength, that the second pilot strength decreases to a new second pilot strength, and that the new second pilot strength is sufficiently stronger than the new first pilot strength to trigger handover of the WCD from being served by base station 12 to being served by base station 14. In this example, the decrease in the first pilot strength may be due to the WCD moving to where coverage of base station 12 is obstructed, while the decrease in the second pilot strength may be a result of other factors. The decrease of the first pilot strength in this example would be much more substantial than the decrease of the second pilot strength, reaching the point where the second pilot strength is so much greater than the first pilot signal strength that the WCD would hand over from being served by base station 12 to being served by base station 14.

Continuing with reference to FIG. 3, at block 34, in response to at least detecting the asymmetric signal-strength transition (and thus possibly based on one or more additional factors or conditions), the WCD transmits to a network entity an indication that the location of coverage of base station 14 is an uncertain representation of location of the WCD.

In practice, this transmission from the WCD could be a general indication that, if location of the WCD were to be represented as location of coverage of a base station serving the WCD (contrasted with more granular location information for instance), that location of coverage of the base station serving the WCD is uncertain. Alternatively, if the WCD specifies the identity its serving base station (e.g., its serving coverage area) specifically and/or provides the location of coverage of the base station specifically, the WCD could specify that the location of that coverage is a questionable representation of the location of the WCD. The WCD could provide this indication in the form of a flag, value, or other data that a recipient entity would be arranged to interpret as indicating that location of the WCD's serving coverage area is a questionable representation of the WCD's location.

Further, the indication transmitted by the WCD could convey more information than just that the location of coverage of the base station is an uncertain representation of the WCD's location. For instance, the WCD could further include as part of the indication or as additional information a rating or score of the uncertainty level, perhaps based on how long the asymmetric signal-strength transition or at least the asymmetric signal-strength change with respect to the base stations took. By way of example, if the asymmetric signal-strength change occurred in two seconds or less, the WCD could determine that the uncertainty is fairly high (as it seems most likely that the WCD location is not best represented by the location of coverage of base station 14). Whereas, if the asymmetric signal-strength change occurred in a longer period of time, such as ten seconds to a minute or so, then the WCD could determine that the uncertainty is fairly low (as it is not as clear that the WCD location is not best represented by the location of coverage of base station 14). The WCD may thus include a "confidence" indicator accordingly. As another example, in a scenario where the WCD detects an asymmetric signal-strength transition, the WCD could responsively provide in its transmission an indication of its previously serving coverage area, as a possibly better indication of the WCD's current location.

Thus, in one of the examples described above, the WCD could transmit the indication to the LBSP, so that the LBSP would determine from the indication that location of the WCD's serving coverage area is a questionable representation of the WCD's location. And in another of the examples described above, the WCD could transmit the indication to the location-determination platform, and the location-determination platform could then pass the indication to the LBSP. In the emergency services example, upon receipt of such an indication and receipt of WCD location represented as location of the WCD's serving coverage area, the PSAP could prompt an operator to ask the a user of the WCD to provide more information about the user's location, so as to help ensure that emergency personnel get dispatched to a more specific, correct location. Other examples are possible as well.

Figure 4:
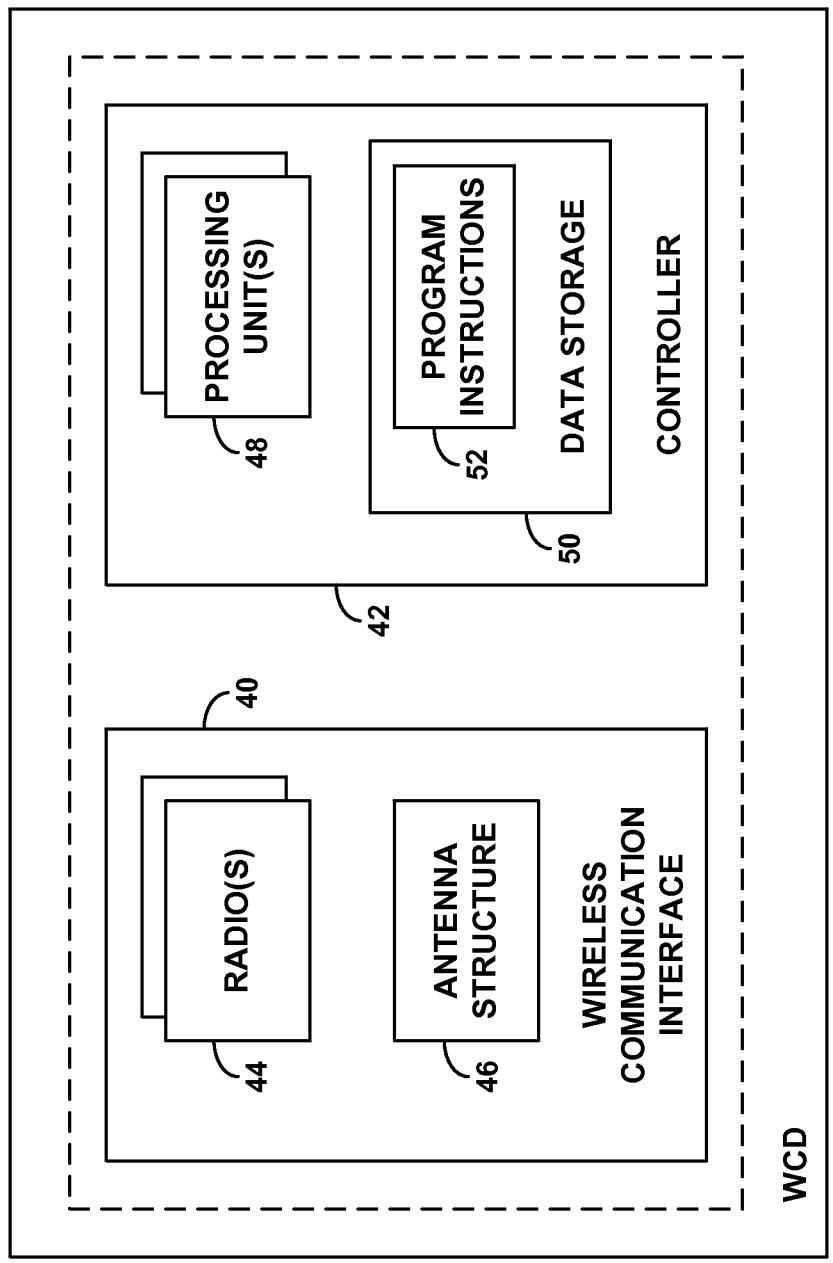
FIG. 4 is a simplified block diagram of an example WCD operable in accordance with the disclosure.

FIG. 4 is next a simplified block diagram of a WCD, showing some of the components that may be included in such a device to facilitate various features described above, to detect and report location uncertainty due to asymmetric signal-strength transition. As shown, the example WCD includes a wireless communication interface 40 and a controller 42, which may be integrated together (e.g., on a common chipset) or communicatively linked together by a system bus or other connection mechanism. Although not shown, the WCD may also include user interface components to facilitate interaction with a user, such as to allow a user to place and engage in an emergency services call and/or another type of communication.

As further shown, the wireless communication interface 40 may include one or more radios 44 compliant with one or more air interface protocols such as those noted above, and an antenna structure 46, cooperatively allowing the WCD to receive pilot signals from base stations and to engage in other sorts of air interface communication in line with the discussion above.

In addition, as shown, the controller 42 may include one or more processing units 48, data storage (e.g., volatile and/or non-volatile non-transitory storage components, such as magnetic, optical, and/or flash storage) 50, and program instructions 52 stored in the data storage and executable by the processing unit(s) 48 to carry out various features described herein, such as to monitor signal strength of the received pilot signals, to detect an asymmetric signal-strength transition of the WCD, and, responsive to at least detecting the asymmetric signal-strength transition of the WCD, to report location-uncertainty to a network entity.

In line with the discussion above, while the WCD is being served by base station 12 and not by base station 14, the wireless communication interface 40 may thus receive a first pilot signal from base station 12 and a second pilot signal from base station 14, and the controller 42 may determine, based on the monitoring, that first pilot signal has a first pilot strength, that the second pilot signal has a second pilot strength, and that the second pilot strength is not sufficiently stronger than the first pilot strength to trigger handover of the WCD from being served by base station 12 to being served by base station 14.

In turn, detecting the asymmetric signal-strength transition may involve (i) detecting, based on the monitoring, a decrease in the first pilot signal strength and an absence of a corresponding proportional increase in the second pilot strength, to a point that the second pilot strength becomes sufficiently stronger than the first pilot strength to trigger handover of the WCD from being served by base station 12 to being served by base station 14, and (ii) detecting that, due to the second pilot strength thereby becoming sufficiently stronger than the first pilot strength, the WCD has handed over from being served by base station 12 to being served by base station 14.

As further discussed above, the WCD may then report the location-uncertainty to the network entity by transmitting to the network entity an indication that location of coverage of base station 14 is an uncertain representation of location of the WCD. Moreover, various other features discussed above in connection with the method of FIG. 3 and as described in other contexts can apply here as well.

Exemplary embodiments have been described above. Those skilled in the art will understand, however, that changes and modifications may be made to these embodiments without departing from the true scope and spirit of the invention.

We claim:

1. A method for establishing location uncertainty due to asymmetric signal-strength transition of a wireless communication device (WCD), the method comprising:

while the WCD is being served by a first base station and not by a second base station, (i) using by the WCD at least one radio receiver to receive a first pilot signal from the first base station and a second pilot signal from the second base station, (ii) monitoring by the WCD a first pilot strength of the received first pilot signal and a second pilot strength of the received second pilot signal, and (iii) based on the monitoring, determining by the WCD that the second pilot strength is not sufficiently stronger than the first pilot strength to trigger handover of the WCD from being served by the first base station to being served by the second base station;

detecting by the WCD an asymmetric signal-strength transition of the WCD comprising (i) based on the monitoring, detecting by the WCD a decrease in the first pilot strength and an absence of a corresponding proportional increase in the second pilot strength, to a point that the second pilot strength becomes sufficiently stronger than the first pilot strength to trigger handover of the WCD from being served by the first base station to being served by the second base station, and (ii) detecting that, due to the second pilot strength thereby becoming sufficiently stronger than the first pilot strength, the WCD has handed off from being served by the first base station to being served by the second base station; and responsive to at least the detecting of the asymmetric signal-strength transition, transmitting from the WCD to a network entity an indication that location of coverage of the second base station is an uncertain representation of location of the WCD.

2. The method of claim 1, wherein detecting the decrease of the first pilot signal strength and the absence of a corresponding proportional increase in the second pilot strength, to a point that the second pilot strength becomes sufficiently stronger than the first pilot strength to trigger handover of the WCD from being served by the first base station to being served by the second base station, comprises:

detecting that the first pilot strength decreases threshold faster than any increase in the second pilot signal strength, to the point that the second pilot strength becomes sufficiently stronger than the first pilot strength to trigger handover of the WCD from being served by the first base station to being served by the second base station.

3. The method of claim 1, wherein detecting the decrease of the first pilot signal strength and the absence of a corresponding proportional increase in the second pilot strength, to a point that the second pilot strength becomes sufficiently stronger than the first pilot strength to trigger handover of the WCD from being served by the first base station to being served by the second base station, comprises:

detecting that the first pilot strength decreases without any increase in the second pilot strength, to the point that the second pilot strength becomes sufficiently stronger than the first pilot strength to trigger handover of the WCD from being served by the first base station to being served by the second base station.

4. The method of claim 1, wherein detecting the decrease of the first pilot signal strength and the absence of a corresponding proportional increase in the second pilot strength, to a point that the second pilot strength becomes sufficiently stronger than the first pilot strength to trigger handover of the WCD from being served by the first base station to being served by the second base station, comprises:

detecting that the first pilot strength decreases to a new first pilot strength, that the second pilot strength decreases to a new second pilot strength, and that the new second pilot strength is sufficiently stronger than the new first pilot strength to trigger handover of the WCD from being served by the first base station to being served by the second base station.

5. The method of claim 1, wherein the detected decrease in the first pilot strength and absence of a corresponding proportional increase in the second pilot strength results from the WCD moving to a position where communication between the WCD and the first base station is obstructed.

6. The method of claim 1, wherein the WCD is closer to the first base station than to the second base station.

7. The method of claim 1, wherein the network entity comprises a location-determination platform that is configured to determine as the location of the WCD a location of coverage of a base station serving the WCD, whereby the transmitted indication establishes an uncertainty of the determined location.

8. The method of claim 1, wherein the network entity comprises a location-based service provider configured to provide a service based on a location of the WCD, whereby, when the location of the WCD is represented by location of coverage of the second base station, the transmitted indication establishes an uncertainty of the represented location of the WCD.

9. The method of claim 8, wherein the network entity comprises an emergency services system.

10. The method of claim 1, wherein the location of coverage of the second base station comprises a location selected from the group consisting of (i) a centroid of a coverage area of the second base station, (ii) a representative shape of the coverage area of the second base station, and (iii) a location of the second base station.

11. A wireless communication device (WCD) configured to detect and report location uncertainty due to asymmetric signal-strength transition, the WCD comprising:

a wireless communication interface configured to receive pilot signals from base stations; and a controller configured to monitor signal strength of the received pilot signals, to detect an asymmetric signal-strength transition of the WCD, and, responsive to at least detecting the asymmetric signal-strength transition of the WCD, to report location-uncertainty to a network entity, wherein, while the WCD is being served by a first base station and not by a second base station, the wireless communication interface receives a first pilot signal from the first base station and a second pilot signal from the second base station, and the controller determines, based on the monitoring, that first pilot signal has a first pilot strength, that the second pilot signal has a second pilot strength, and that the second pilot strength is not sufficiently stronger than the first pilot strength to trigger handover of the WCD from being served by the first base station to being served by the second base station, wherein detecting the asymmetric signal-strength transition comprises (i) detecting, based on the monitoring, a decrease in the first pilot signal strength and an absence of a corresponding proportional increase in the second pilot strength, to a point that the second pilot strength becomes sufficiently stronger than the first pilot strength to trigger handover of the WCD from being served by the first base station to being served by the second base station, and (ii) detecting that, due to the second pilot strength thereby becoming sufficiently stronger than the first pilot strength, the WCD has handed over from being served by the first base station to being served by the second base station, and wherein reporting location-uncertainty to the network entity comprises transmitting to the network entity an indication that location of coverage of the second base station is an uncertain representation of location of the WCD.

12. The WCD of claim 11, wherein detecting the decrease of the first pilot signal strength and the absence of a corresponding proportional increase in the second pilot strength, to a point that the second pilot strength becomes sufficiently stronger than the first pilot strength to trigger handover of the WCD from being served by the first base station to being served by the second base station, comprises:

detecting that the first pilot strength decreases threshold faster than any increase in the second pilot signal strength, to the point that the second pilot strength becomes sufficiently stronger than the first pilot strength to trigger handover of the WCD from being served by the first base station to being served by the second base station.

13. The WCD of claim 11, wherein detecting the decrease of the first pilot signal strength and the absence of a corresponding proportional increase in the second pilot strength, to a point that the second pilot strength becomes sufficiently stronger than the first pilot strength to trigger handover of the WCD from being served by the first base station to being served by the second base station, comprises:

detecting that the first pilot strength decreases without any increase in the second pilot strength, to the point that the second pilot strength becomes sufficiently stronger than the first pilot strength to trigger handover of the WCD from being served by the first base station to being served by the second base station.

14. The WCD of claim 11, wherein detecting the decrease of the first pilot signal strength and the absence of a corresponding proportional increase in the second pilot strength, to a point that the second pilot strength becomes sufficiently stronger than the first pilot strength to trigger handover of the WCD from being served by the first base station to being served by the second base station, comprises:

detecting that the first pilot strength decreases to a new first pilot strength, that the second pilot strength decreases to a new second pilot strength, and that the new second pilot strength is sufficiently stronger than the new first pilot strength to trigger handover of the WCD from being served by the first base station to being served by the second base station.

15. The WCD of claim 11, wherein the detected decrease in the first pilot strength and absence of a corresponding proportional increase in the second pilot strength results from the WCD moving to a position where communication between the WCD and the first base station is obstructed.

16. The WCD of claim 11, wherein the WCD is closer to the first base station than to the second base station.

17. The WCD of claim 11, wherein the network entity comprises a location-determination platform that is configured to determine as the location of the WCD a location of coverage of a base station serving the WCD, whereby the transmitted indication establishes an uncertainty of the determined location.

18. The WCD of claim 11, wherein the network entity comprises a location-based service provider configured to provide a service based on a location of the WCD, whereby, when the location of the WCD is represented by location of coverage of the second base station, the transmitted indication establishes an uncertainty of the represented location of the WCD.

19. The WCD of claim 18, wherein the network entity comprises an emergency services system.

20. The WCD of claim 11, wherein the location of coverage of the second base station comprises a location selected from the group consisting of (i) a centroid of a coverage area of the second base station, (ii) a representative shape of the coverage area of the second base station, and (iii) a location of the second base station.

* * * * *